United States Patent [19]
Himes et al.

[11] Patent Number: 6,021,022
[45] Date of Patent: Feb. 1, 2000

[54] FLEXURE DISPLACEMENT LIMITER-FLEX CIRCUIT INTERCONNECT

[75] Inventors: Adam K. Himes, Richfield; Roger A. Resh, Prior Lake, both of Minn.

[73] Assignee: Seagate Technology, Inc., Scotts Valley, Calif.

[21] Appl. No.: 09/047,203

[22] Filed: Mar. 24, 1998

Related U.S. Application Data

[60] Provisional application No. 60/063,611, Oct. 27, 1997.

[51] Int. Cl.[7] .................................................. G11B 5/48
[52] U.S. Cl. ............................................... 360/104
[58] Field of Search ............................................ 360/104

[56] References Cited

U.S. PATENT DOCUMENTS

| | | | |
|---|---|---|---|
| 3,696,351 | 10/1972 | Groom et al. | 340/174.1 |
| 4,141,050 | 2/1979 | Wiseley | 360/104 |
| 4,309,732 | 1/1982 | Kronfeld et al. | 360/104 |
| 4,432,027 | 2/1984 | Higuchi | 360/104 |
| 4,538,865 | 9/1985 | Wakabayashi et al. | 339/17 |
| 4,616,279 | 10/1986 | Poorman | 360/103 |
| 4,645,280 | 2/1987 | Gordon et al. | 339/17 |
| 4,670,804 | 6/1987 | Kant et al. | 360/102 |
| 4,789,914 | 12/1988 | Ainslie et al. | 360/103 |
| 4,819,094 | 4/1989 | Oberg | 360/104 |

(List continued on next page.)

FOREIGN PATENT DOCUMENTS

| | | |
|---|---|---|
| 0 121 057 A1 | 10/1984 | European Pat. Off. |
| 0 265 720 A2 | 5/1988 | European Pat. Off. |
| 0 484 906 A2 | 5/1992 | European Pat. Off. |
| 0 671 727 A1 | 9/1995 | European Pat. Off. |
| 0 673 019 A1 | 9/1995 | European Pat. Off. |
| 52-12815 | 1/1977 | Japan . |
| 52-9417 | 1/1977 | Japan . |
| 53-19015 | 2/1978 | Japan . |
| 53-30310 | 3/1978 | Japan . |
| 55-25803 | 2/1980 | Japan . |
| 56-19554 | 2/1981 | Japan . |
| 57-167162 | 10/1982 | Japan . |
| 59-31128 | 7/1984 | Japan . |
| 60-12686 | 4/1985 | Japan . |
| 60-19045 | 5/1985 | Japan . |
| 60-246015 | 12/1985 | Japan . |
| 5-159497 | 6/1993 | Japan . |
| 2 193 833 | 2/1988 | United Kingdom . |
| 2 233 143 | 1/1991 | United Kingdom . |
| 2 295 918 | 6/1996 | United Kingdom . |

OTHER PUBLICATIONS

"Actuator Assembly For A Disk File," by J. Dunman et al., *IBM Corp.*, vol. 20, No. 5, 1977, pp. 1984–1985.

"Combination Suspension–Lead Cable For a Multi–Gap Read/Write Head," by J. Reidenbach, *IBM Corp.*, vol. 22, No. 4, 1979, pp. 1602–1603.

*Primary Examiner*—A. J. Heinz
*Attorney, Agent, or Firm*—Westman, Champlin & Kelly P.A.

[57] ABSTRACT

A disc drive flex circuit head interconnect includes a base dielectric layer, a plurality of electrical conductors disposed on the base dielectric layer, and a displacement limiter coupled to the base dielectric layer. The displacement limiter is adapted to contact a disc drive load beam when the interconnect is displaced a selected distance.

A disc drive head suspension assembly includes a load beam, a flex circuit head interconnect, and a head. The load beam has a tongue with a distal end and a dimple extending downwardly therefrom. The flex circuit head interconnect is disposed on the load beam, the interconnect has a base dielectric layer, a plurality of electrical conductors disposed thereon, and a head attach region. The head has a top side and an air bearing surface bottom side, the head is coupled to the head attach region of the flex circuit head interconnect such that the head gimbals about the dimple. The flex circuit head interconnect includes a displacement limiter disposed proximate the head attach region, the limiter contacting the tongue when the head is moved a predetermined distance away from the dimple.

19 Claims, 7 Drawing Sheets

U.S. PATENT DOCUMENTS

| | | | |
|---|---|---|---|
| 4,928,195 | 5/1990 | Ezaki et al. | 360/103 |
| 4,942,562 | 7/1990 | Suzuki | 369/44.11 |
| 4,982,195 | 1/1991 | Olivenbaum et al. | 342/51 |
| 4,991,045 | 2/1991 | Oberg | 360/104 |
| 4,996,623 | 2/1991 | Erpelding et al. | 360/104 |
| 5,001,583 | 3/1991 | Matsuzaki | 360/104 |
| 5,006,946 | 4/1991 | Matsuzaki | 360/104 |
| 5,185,683 | 2/1993 | Oberg et al. | 360/104 |
| 5,333,085 | 7/1994 | Prentice et al. | 360/104 |
| 5,384,432 | 1/1995 | Noro et al. | 174/117 |
| 5,485,434 | 1/1996 | Chaya | 369/13 |
| 5,490,027 | 2/1996 | Hamilton et al. | 360/104 |
| 5,491,597 | 2/1996 | Bennin et al. | 360/104 |
| 5,519,552 | 5/1996 | Kohira et al. | 360/104 |
| 5,594,708 | 1/1997 | Chaya | 369/13 |
| 5,598,307 | 1/1997 | Bennin | 360/104 |
| 5,608,590 | 3/1997 | Ziegler et al. | 36/104 |
| 5,815,349 | 9/1998 | Frater | 360/104 |
| 5,892,637 | 4/1999 | Brooks | 360/104 |

FLEXURE DISPLACEMENT LIMITER-FLEX CIRCUIT INTERCONNECT

CROSS-REFERENCE TO RELATED APPLICATION

This application claims the priority of an earlier filed co-pending provisional application Ser. No. 60/063,611, filed Oct. 27, 1997, entitled "FLEXURE DISPLACEMENT LIMITER-FLEX CIRCUIT INTERCONNECT.

FIELD OF THE INVENTION

The present invention relates to disc drive storage devices. More specifically, the present invention relates to an apparatus for limiting gimbal displacement with a flex circuit interconnect.

BACKGROUND OF THE INVENTION

Disc drives are the primary devices employed for mass storage of computer programs and data used in computer systems. Within a disc drive, a load beam supports a hydrodynamic air bearing (or slider) proximate a rotating magnetic disc. The load beam supplies a downward force that counteracts the hydrodynamic lifting force developed by the air bearing. The slider carries a magnetic transducer for communicating with individual bit positions on the rotating magnetic disc. The combination of a slider and a transducer is generally called a head.

The load beam is coupled to an actuator arm which is, in turn, coupled to an actuator system. The actuator system positions the slider, and hence the transducer, relative to the disc to access desired tracks on the disc.

A gimbal structure is typically located between the load beam and the slider. The gimbal resiliently supports the slider and allows it to pitch and roll while it follows the topography of the rotating disc.

The use of a flex circuit head interconnect in the disc drive provides many advantages, such as lower costs, and increased robustness. With the current industry trend towards laptop and "notebook" computers, there has been a corresponding need to produce disc drives that are both incorporated in smaller packages and able to withstand the higher shock and vibration forces that are naturally to be expected when computers of this type are being carried from place to place. For example, some computer manufacturers demand that all sub-assemblies of their systems be able to withstand non-operating shock loads in the range of 300 g. A typical solution to the problem of large shock loads has been to ramp load and unload the heads, thus preventing "head slap" or potentially damaging contact between the heads and discs.

While ramp loading/unloading obviates the risk of damage due to head slap, such large shocks create another mode for potential failure. When read/write heads are ramp-parked off the surface of the disc, the only material supporting the slider itself is the relatively weak gimbal. Shock loads of 300 g have been shown to be large enough to permanently deform the gimbal, resulting in the inoperability of the entire disc drive.

In general, gimbal displacement limiters have been designed to limit the deflection of the gimbal away from the load point. Typically, these designs require special forming of the gimbal and/or load beam. As a result, their incorporation into modern disc drives requires additional fabrication to the gimbal and/or load beam, thus increasing costs.

SUMMARY OF THE INVENTION

A disc drive flex circuit head interconnect includes a base dielectric layer, a plurality of electrical conductors disposed on the base dielectric layer, and a displacement limiter coupled to the base dielectric layer. The displacement limiter is adapted to contact a disc drive load beam when the interconnect is displaced a selected distance.

A disc drive head suspension assembly includes a load beam, a flex circuit head interconnect, and a head. The load beam has a tongue with a distal end and a dimple extending downwardly therefrom. The flex circuit head interconnect is disposed on the load beam, the interconnect has a base dielectric layer, a plurality of electrical conductors disposed thereon, and a head attach region. The head has a top side and an air bearing surface bottom side, the head is coupled to the head attach region of the flex circuit head interconnect such that the head gimbals about the dimple. The flex circuit head interconnect includes a displacement limiter disposed proximate the head attach region, the limiter contacting the tongue when the head is moved a predetermined distance away from the dimple.

DETAILED DESCRIPTION OF THE PREFERRED EMBODIMENTS

Figure 1:
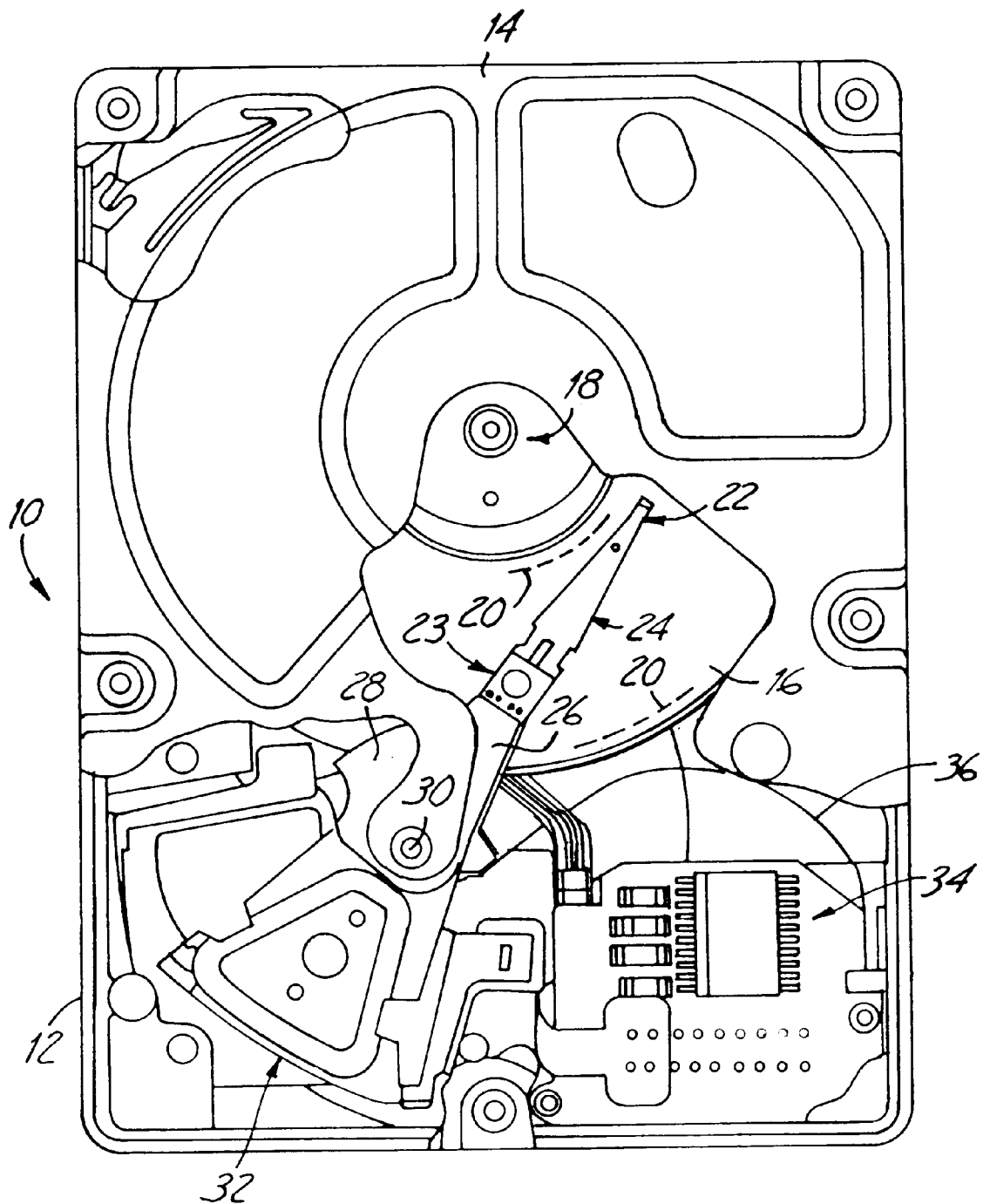
FIG. 1 is a top plan view of a disc drive in which the present invention is particularly useful.

FIG. 1 is a top plan view of a disc drive in which the present invention is particularly useful. Disc drive 10 includes base member 12 to which all other components are directly or indirectly mounted and top cover 14 (shown in partial cutaway) which together with base member 12 forms a disc drive housing which encloses delicate internal components and isolates these components from external contaminants.

Disc drive 10 includes a plurality of discs 16 which are mounted for rotation upon a spindle motor shown generally at 18. Discs 16 include on their surfaces a plurality of circular, concentric data tracks, the innermost and outermost are shown with dashed lines at 20, on which data are recorded via an array of vertically aligned heads 22 (one of which is shown in FIG. 1). Heads 22 are supported by load beams 24, which are attached to actuator mounting arms 26. Actuator head mounting arms 26 are preferably integral with an actuator bearing housing 28 which is mounted via an array of ball bearing assemblies (not designated) for rotation about a pivot shaft 30.

Power to drive actuator bearing housing 28 in its rotation about pivot shaft 30 is provided by a voice coil motor (VCM) shown generally at 32. VCM 32 consists of a coil (not separately designated) which is supported by actuator bearing housing 28 within the magnetic field of an array of permanent magnets (also not separately designated) which are fixably mounted to base member 12, all in a manner well known in the industry. Electronic circuitry 34, generally, is partially carried on a printed circuit board (not shown), and controls all aspects of the operation of disc drive 10. Circuitry 34 is provided with control signals which drive VCM 32. Such signals are carried from electronic circuitry 34 via a flexible printed circuit cable 36.

Figure 2:
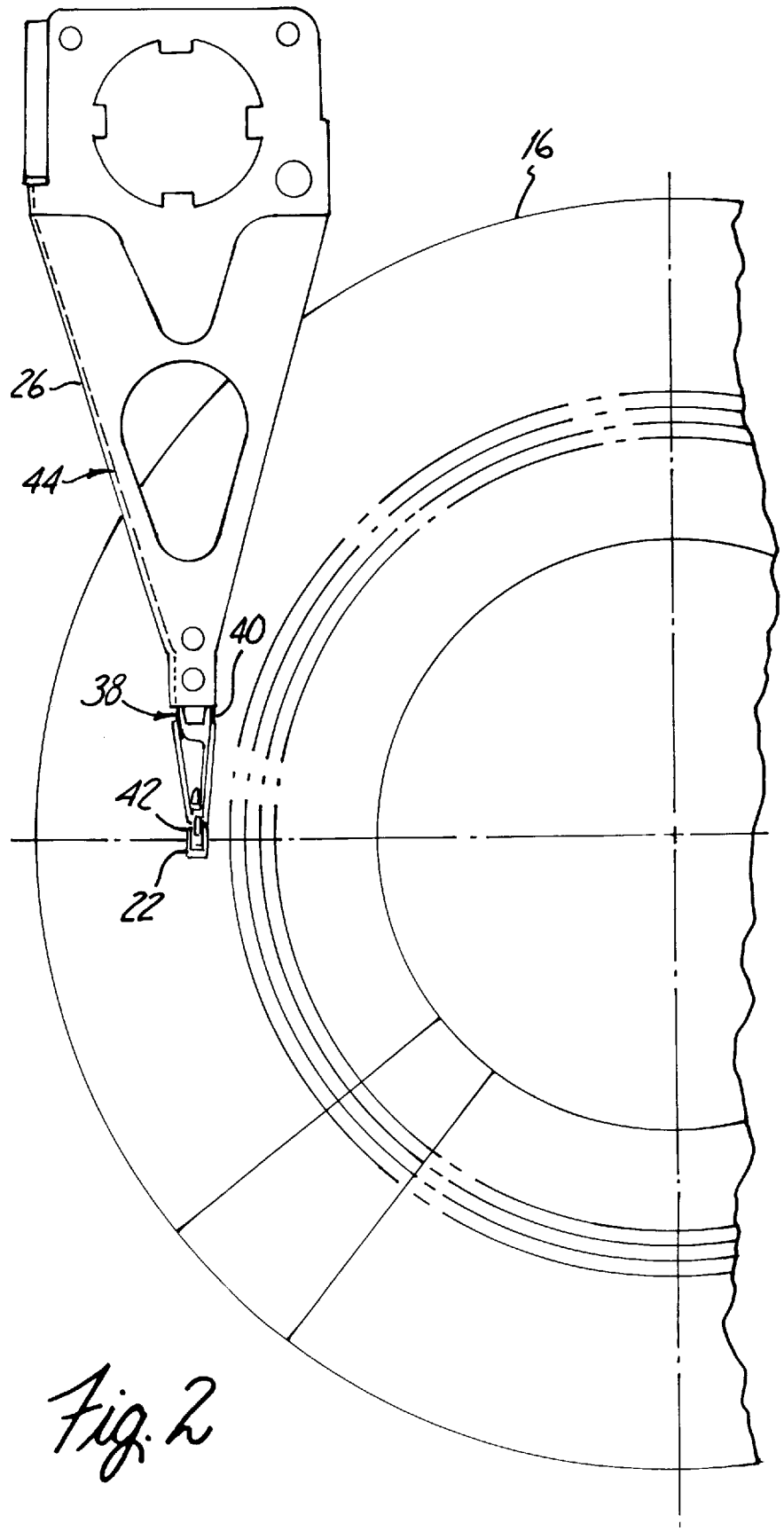
FIG. 2 is an enlarged top plan view illustrating a disc and a head suspension assembly.

FIG. 2 is a diagrammatic view of a disc drive magnetic head assembly. FIG. 2 shows one of actuator mounting arms 26 which is supported above storage disc 16 by actuator bearing housing 28 (shown in FIG. 1). Actuator mounting arm 26 extends from an actuator (not shown in FIG. 2) and attaches to head suspension assembly 38. Head suspension assembly 38 includes load beam 40, gimbal 42, head 22, and flex circuit head interconnect 44.

Gimbal 42 is coupled to load beam 40 and is preferably attached to head 22 by an adhesive such as glue or fluid epoxy. Alternatively, gimbal 42 may be mounted to head 22 by other conventional mounting methods. Gimbal 42 resiliently supports head 22 in the vertical directly to allow head 22 to follow the topography of disc 16. Load beam 40 and gimbal 42 also supply a downward force to counteract the hydrodynamic lifting force developed as disc 16 moves beneath head 22. Gimbal 42 and load beam 40 are preferably formed from a material which enables flexibility in the vertical direction and rigidity in-plane directions for precise head positioning. Gimbal 42 is resiliently flexible in pitch and roll directions of head 22. At the same time, gimbal 42 is preferably rigid in the in-plane directions for maintaining precise head positioning.

Head 22 preferably comprises an air-bearing slider (not shown in FIG. 2) supporting at least one magnetic transducer. Head 22 stores and retrieves information stored on memory storage disc 16. Head 22 is electrically operably coupled to control circuitry 34 via flex circuit head interconnect 44 which extends between the magnetic transducers of head 22 and control circuitry 34.

Flex circuit head interconnect 44 comprises electrical conductors which extend from magnetic transducers on head 22 to control circuitry 34. Interconnect 44 conveys electrical signals between magnetic transducers on head 22 and control circuitry 34. Flexible circuit head interconnect 44 can accommodate a variety of interconnection embodiments. For example, one such embodiment is termed "flex over" construction, and is described with respect to FIG. 3. Another such embodiment is termed "flex gimbal" construction and is described with respect to FIG. 4. Those skilled in the art will recognize that the teachings of the present invention may be applied to other flex circuit head interconnection embodiments without departing from the spirit and scope of the invention.

Figure 3:
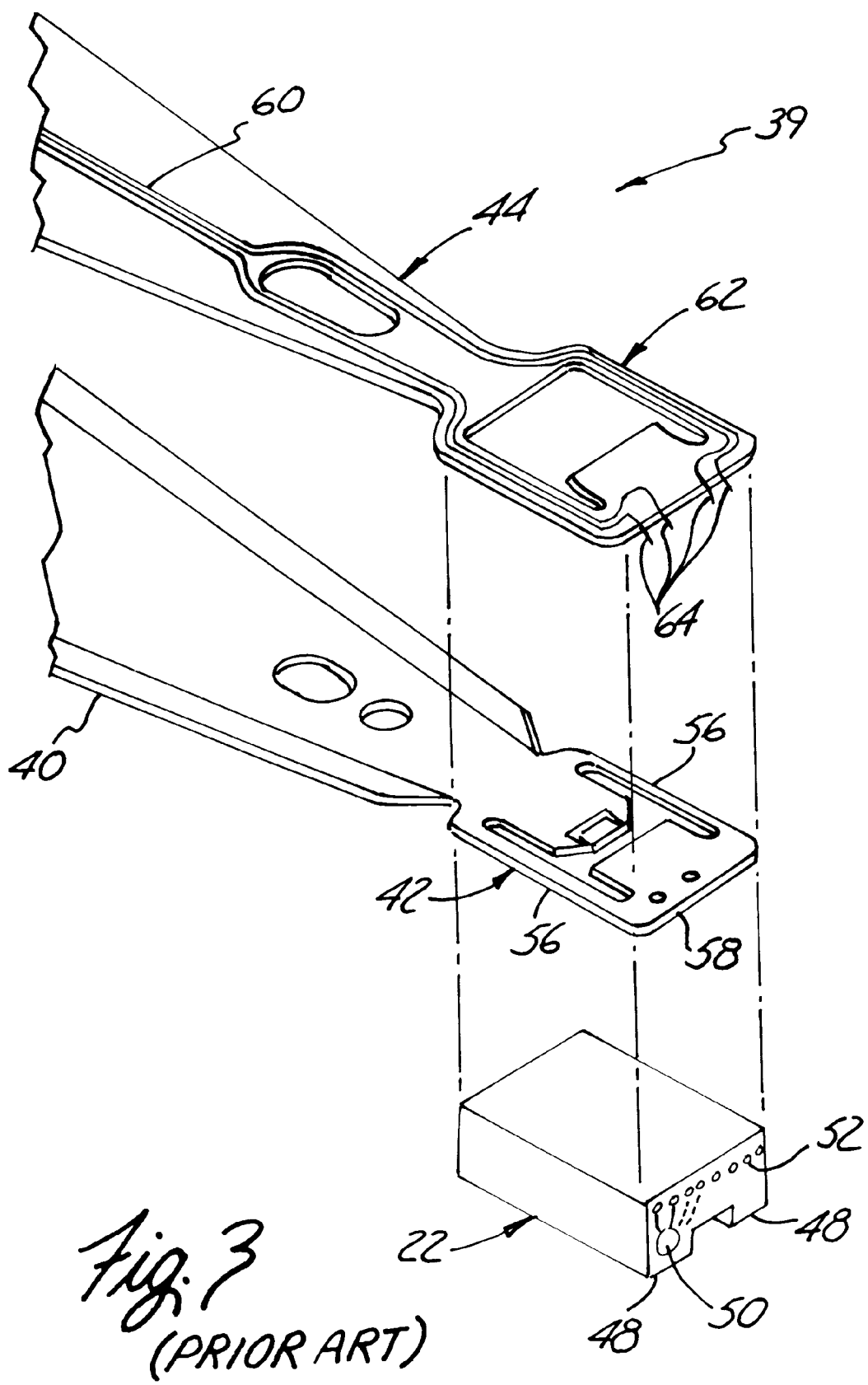
FIG. 3 is an exploded perspective view of a disc drive head gimbal assembly in accordance with "flex over" construction.

FIG. 3 is an exploded perspective view of a portion of head suspension assembly 39 in accordance with the prior art. FIG. 3 shows how head 22, load beam portion 40, gimbal 42 and interconnect 44 are assembled together. The construction shown in FIG. 3 is known as a "flex over" construction. This construction is so termed because interconnect 44 is disposed on top of (away from the disc surface) load beam 40 and gimbal 42.

Slider 22 includes air bearing surfaces 48 which provide lift to head 22 as head 22 moves over a rotating disc. Head 22 also includes magnetic transducers 50 which magnetically couple with magnetic transitions on discs 16 to retrieve data from or store data to discs 16. Magnetic transducers 50 are electrically coupled to bond pads 52 on trailing surface 54 of head 22. Head 22 mounts to gimbal 42 such that head 22 is able to resiliently follow the topography of a disc.

FIG. 3 shows load beam 40 integral with gimbal 42. It should be noted that gimbal 42 may be separate from load beam 40 and attached thereto, by laser welding, or any other appropriate means. Gimbal 42 comprises a pair of parallel elongate arms 56 which extend from locations proximate load beam 40, to a slider coupling region 58. Those skilled in the art will appreciate that parallel arms 56 of gimbal 42 allow gimbal 42 to be compliant in bending and rolling motions of slider 22 while maintaining rigidity in the yaw direction.

Interconnect 44 is a flexible circuit which includes circuit traces 60. Preferably, interconnect 44 includes a gimbal portion 62 which is shaped to match the shape of gimbal 42. As such, gimbal portion 62 of interconnect 44 is supported by gimbal 42. Electrical conductors 60 terminate in flying leads 64 which are electrically coupled to bond pads 52 on slider 22 to electrically couple transducers 50 on slider 22 to electrical circuitry 34 in disc drive 10.

Figure 4:
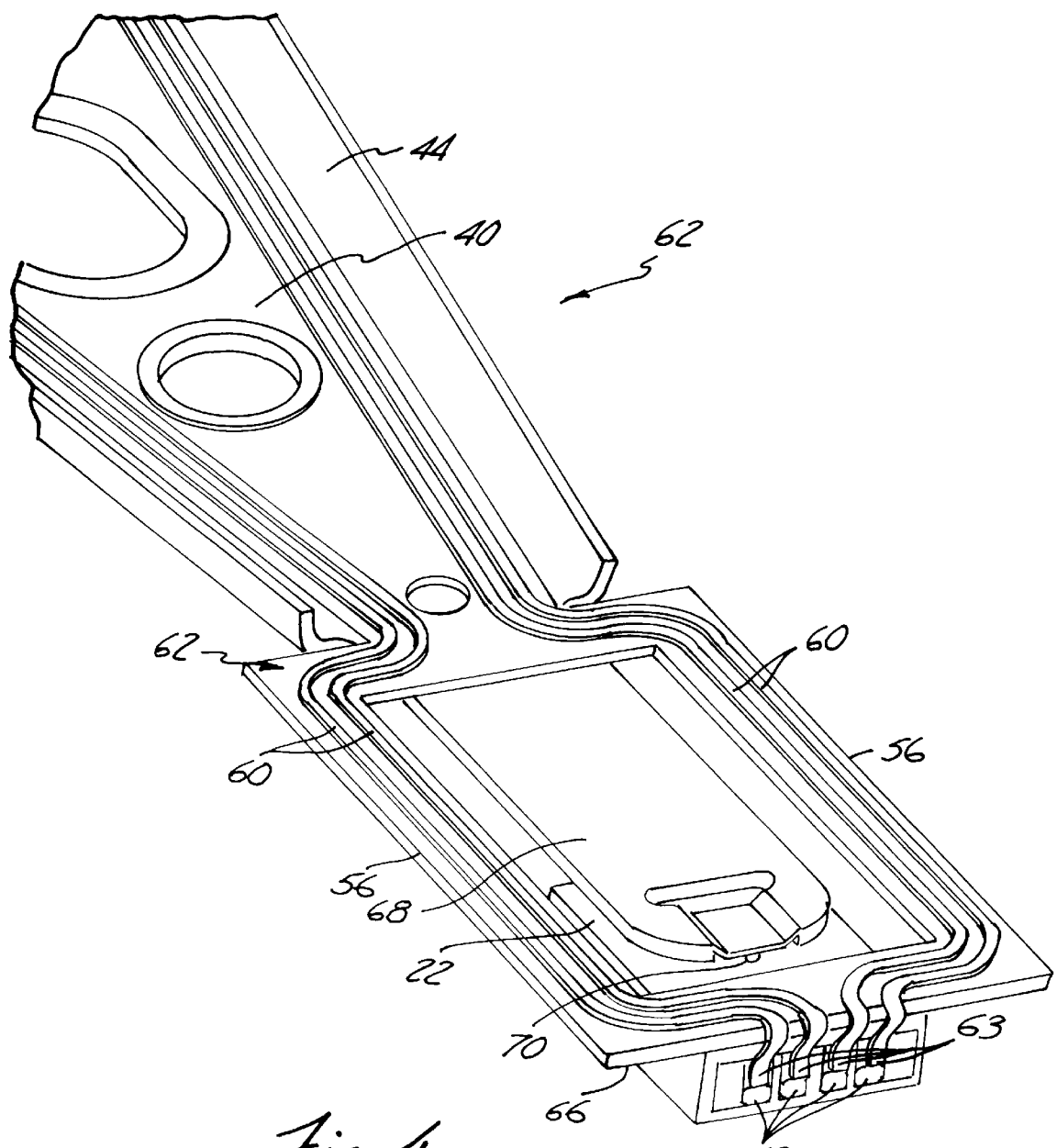
FIG. 4 is a perspective view of a head gimbal assembly employing a "flex gimbal" head gimbal assembly.

FIG. 4 is a top perspective view of a head suspension assembly 62 in accordance with flex gimbal construction. This embodiment differs from the embodiment of FIG. 3 in that the flex circuit interconnect provides the function of the gimbal portion. This is evident from the fact that although interconnect 44 includes a pair of elongated arms 56, such arms are not supported by a gimbal portion. Thus, interconnect elongate arms 56, themselves, provide the gimbal function to head 22. Aside from this difference, the embodiment of FIG. 4 resembles the embodiment of FIG. 3 and like components are numbered similarly. Notably, interconnect 44 is disposed on top of load beam 40. Interconnect 44 includes a plurality of conductors 60 which extend from a head coupling portion 66 of interconnect 44 to control circuitry 34 (not shown in FIG. 4). Additionally, as in FIG. 3, load beam 40 includes a tongue 68 which extends from load beam 40 and provides a dimple 70 about which head 22 gimbals. As in FIG. 3, conductors 60 terminate in flying leads 64 which are coupled to bond pads 52 on slider 22 to thereby operably electrically couple magnetic transducers 50 on head 22 to control circuitry 34.

Although the above-described traditional head suspension assemblies provide many advantages, such as durability and manufacturability, they suffer from limitations. One such limitation is that although the gimbal is supported when a load is applied toward the load point, the gimbal is not supported when a load is applied in an opposite direction. Specifically, if the air bearing surface of head 22 is considered the bottom of head 22, then the gimbal is not supported when head 22 is loaded downwardly. Such displacement can occur during a non-operating mechanical shock to a ramp load/unload system. In response to this characteristic, gimbal displacement limiters have been designed to limit the deflection of the gimbal away from the load point. However, these designs typically require special forming of the gimbal and/or load beam. For example, see U.S. Pat. No. 5,333,085 issued to Prentice et al.

Figure 5:
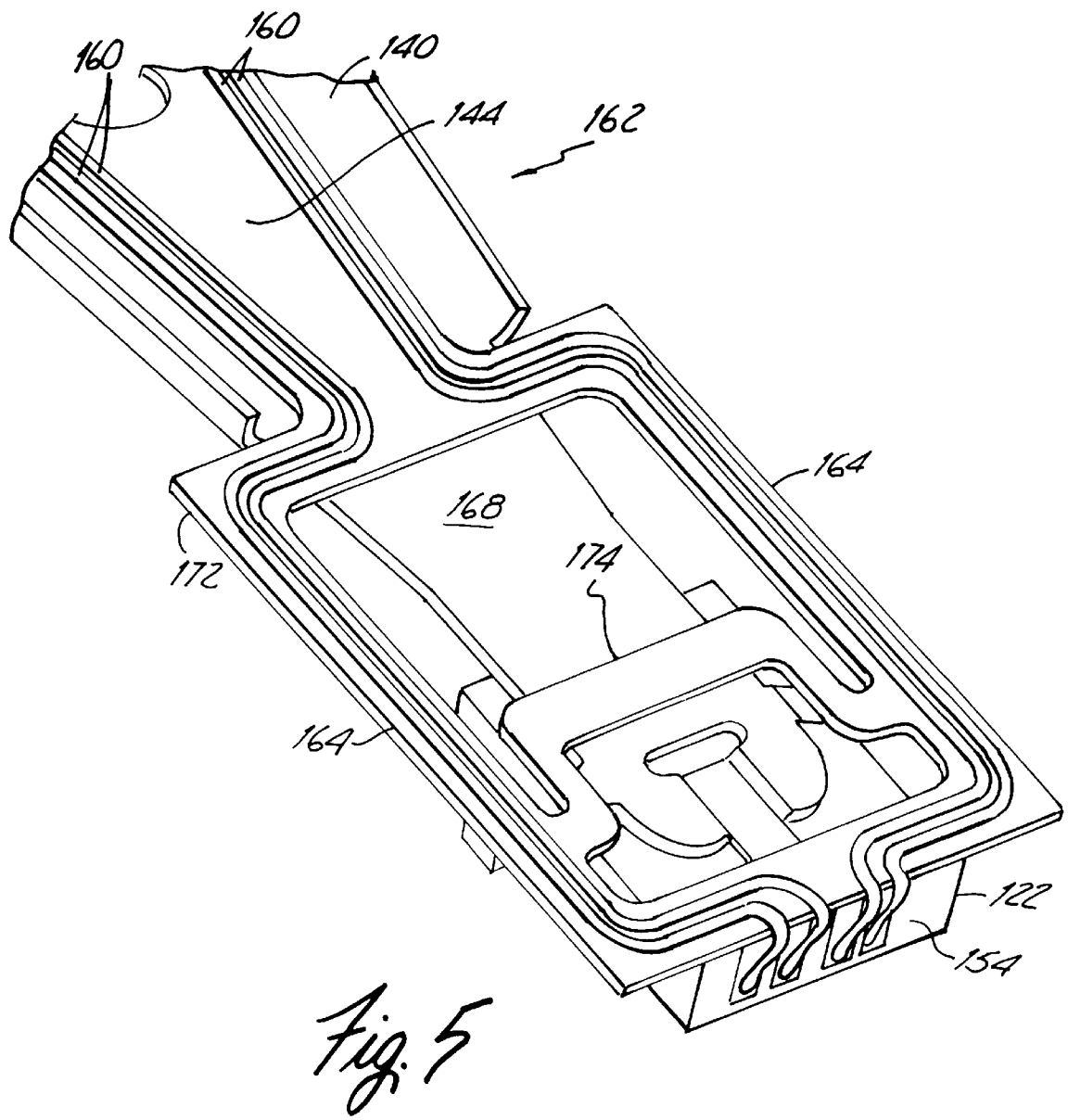
FIG. 5 is a perspective view of a flex gimbal head suspension assembly in accordance with the present invention.

FIG. 5 is a top perspective view of head suspension assembly 162 in accordance with the present invention. Head suspension assembly 162 bears some similarities to head suspension assembly 62 described with respect to FIG. 4 and similar components are numbered similarly. FIG. 5 shows interconnect 144 disposed on top of load beam 140. Load beam 140 includes tongue 168 which provides a dimple 170 (shown in FIG. 6) about which head 122 gimbals. Flex circuit interconnect 144 preferably comprises base dielectric layer 172, and etched conductors 160 which are fixedly disposed on base dielectric layer 172. Conductors 160 are preferably constructed from copper, while base dielectric layer 172 is preferably constructed from a polyimide which provides good tear-resistance, such as Kapton which is available from Dupont.

One of the main features of the present invention is strap 174 on flex circuit interconnect 144. As in the embodiment of FIG. 4, interconnect 144 comprises two elongate arms 164 which provide head 122 with sufficient compliance such that head 122 may roll and pitch with the topography of a disc rotating thereunder. Strap 174 is preferably integral with base dielectric layer 172 of flex circuit interconnect 144. Strap 174 extends transversely between elongate arms 164 over tongue 168. In this manner, downward movement of head 122 is limited by strap 174 colliding with tongue 168. FIG. 5 also shows additional features on load beam 140 which provide additional displacement limitations. Specifically, load beam 140 includes ears 176 and extended dimple offset form 178. Ears 176 extend under elongate arms 164 of flex circuit interconnect 144. In this manner, downward gimbal displacement is further limited by collision between elongate arms 164 and ears 176. Additionally, extended dimple offset form 178 extends from tongue 168 of load beam 144 toward trailing surface 154 of slider 122. In this manner downward gimbal movement is limited further still by collision between extended dimple offset form 178 and head coupling portion 166 of interconnect 144.

Figure 6:
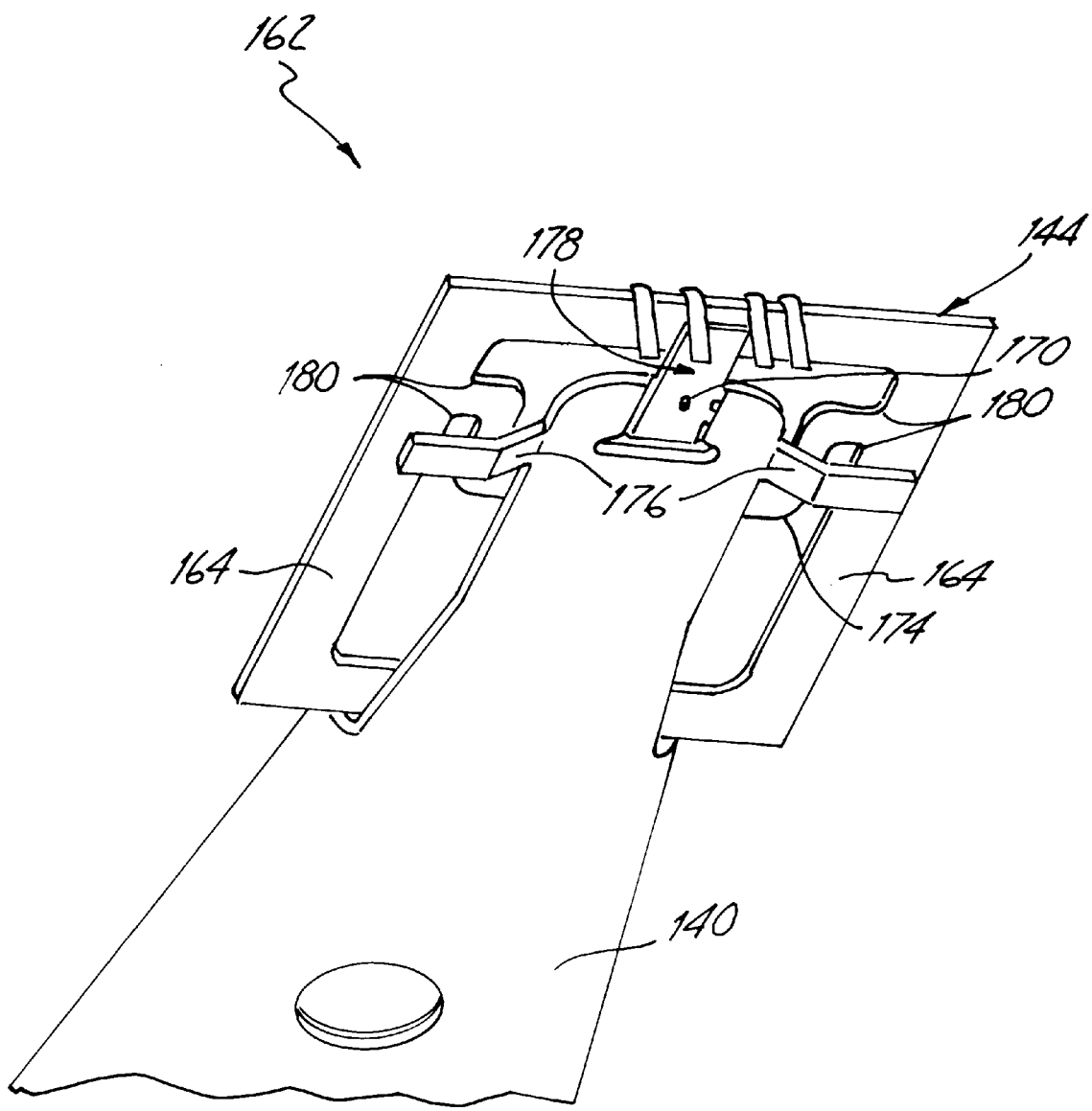
FIG. 6 is a bottom perspective view of a flex gimbal head suspension assembly in accordance with the present invention.

FIG. 6 is a bottom perspective view of head suspension assembly 162 in accordance with the present invention. FIG. 6 is included primarily to show the features of ears 176 and extended dimple offset form 178. As can be seen in FIG. 6, it is preferred that locations 180, where strap 174 couples to elongate arms 164 be rounded so that stresses will not be focussed in tight corners. In this manner, the probability of tearing at locations 180 is reduced, and durability and longevity is thereby enhanced. Those skilled in the art will appreciate that displacement limiting features of flex circuit interconnect 144 may act alone, or in conjunction with special features on load beam 140 to limit gimbal displacement away from dimple 170. Further, the configuration of strap 174 should be optimized to have a minimum contribution to gimbal stiffness. This optimization may be performed in any appropriate manner.

Figure 7:
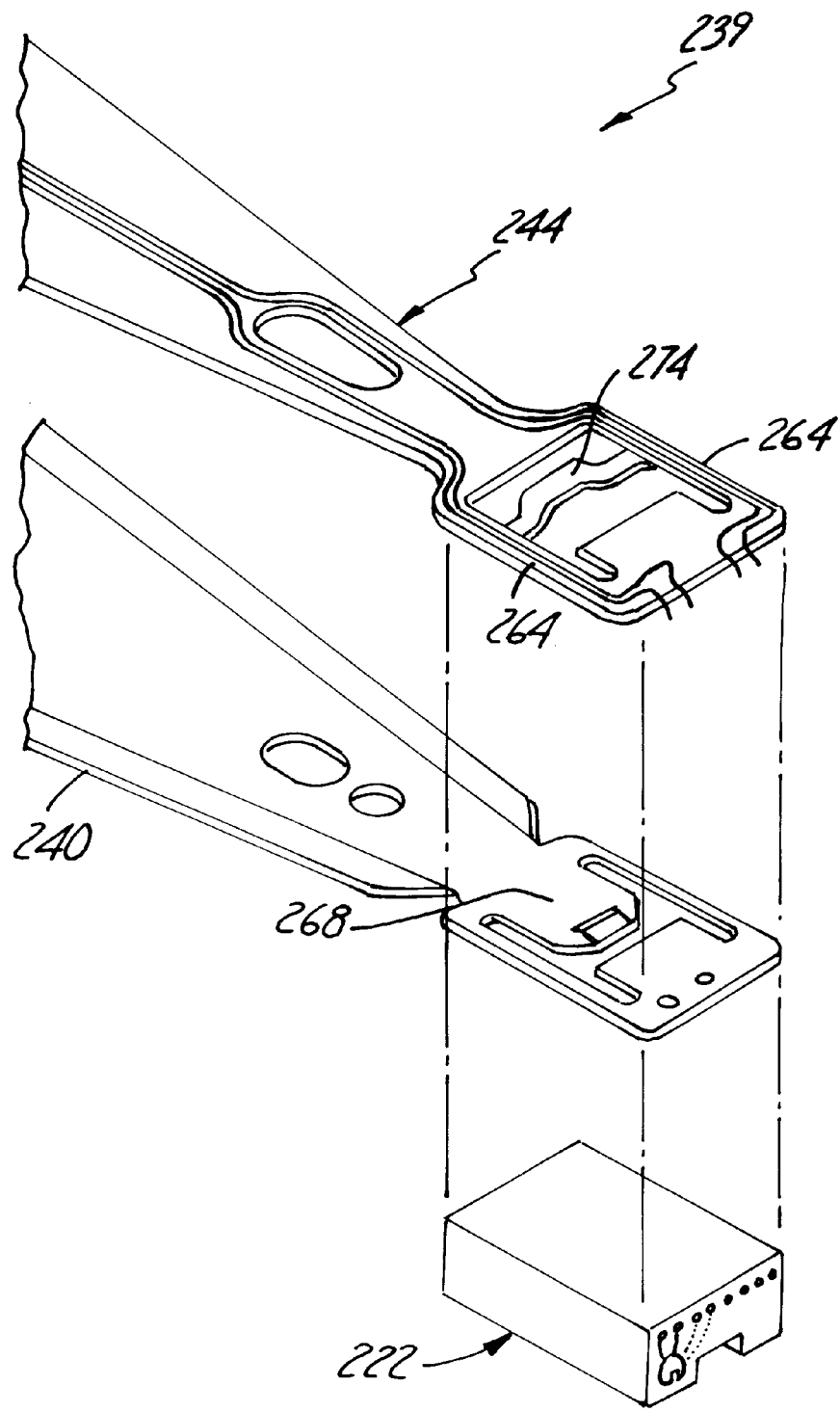
FIG. 7 is an exploded perspective view of a flex over construction type head suspension assembly in accordance with the present invention.

FIG. 7 is a perspective exploded view of head suspension assembly 239 in accordance with the present invention and a "flex over" construction. Head suspension assembly 239 bears some similarities to head suspension assembly 39, described with respect to FIG. 3, and similar components are numbered similarly. In fact, head 222 of head suspension assembly 239 is identical to head 22 of head suspension assembly 39. One main difference between head suspension assembly 239 and head suspension assembly 39 is strap 274 of flex circuit interconnect 244. Specifically, strap 274 is preferably constructed from the same base dielectric material as the rest of flex circuit interconnect 244 and extends transversely from each of elongate arms 264 to traverse tongue 268 of load beam 240. More preferably, strap 274 is formed integrally with the base dielectric layer of interconnect 244. It should be noted that ears, similar to ears 176 (described with respect to FIG. 6) could be added to tongue 268 which ears would then collide with elongate arms 256 of gimbal 242 when gimbal 242 is displaced away from the Load point. However, an extended dimple offset form, such as the extended dimple offset form 178 (described with respect to FIG. 6) is not compatible with the flex over construction of head suspension assembly 239.

In conclusion, the present invention provides features which limit gimbal displacement away from the load point without requiring load beam modification. Further, enhanced gimbal displacement limitation may be realized through relatively minor load beam modifications, such as the provision of ears or the extended dimple offsets. Thus, the gimbal displacement limiting features of the present invention provide reduced handling damage. Further, improved robustness to non-operating mechanical shock for head suspension assemblies for shipping or ramp load designs may now be realized. Also, by selecting the longitudinal position of the strap (such as strap 74 in FIG. 5) a preferential torque can be applied to the slider to bias the leading edge up during the unload process of ramp load/unload applications. Additionally, the present invention helps prevent gimbal damage for a ramp unload with negative pressure air bearing slider designs. Further still, the present invention can be used with existing suspension assemblies. Finally, the present invention may even be used with existing gimbals and flex circuits.

Although the present invention has been described with reference to preferred embodiments, workers skilled in the art will recognize that changes may be made in form and detail without departing from the spirit and scope of the invention.

What is claimed is:

1. A disc drive flex circuit head interconnect for coupling to a head flying over a disc, the interconnect comprising:
    a base dielectric layer;
    a plurality of electrical conductors disposed on the base dielectric layer; and
    a displacement limiter coupled to the base dielectric layer and adapted to contact a disc drive load beam when the interconnect is displaced downwardly a selected distance.

2. The apparatus of claim 1 wherein the dielectric layer is constructed from a polyimide.

3. The apparatus of claim 1 wherein the flex circuit head interconnect further includes a head attach portion having a pair of elongate arms.

4. The apparatus of claim 3 wherein the displacement limiter comprises a strap which extends between the elongate arms.

5. The apparatus of claim 4 wherein the displacement limiter extends generally transversely between the elongate arms.

6. The apparatus of claim 3 wherein the pair of elongated arms are parallel and extend to a transverse region which is adapted to couple a disc drive head.

7. The apparatus of claim 1 wherein the displacement limiter is constructed from an identical material as the base dielectric layer.

8. The apparatus of claim 1 wherein the displacement limiter is integral with the base dielectric layer.

9. A disc drive head suspension assembly comprising:
    a load beam having a tongue with a distal end and a dimple extending downwardly therefrom;
    a flex circuit head interconnect disposed on the load beam, the flex circuit head interconnect having a base dielectric layer, a plurality of electrical conductors coupled to the dielectric layer and a head attach region;
    a head having a top side and an air bearing surface bottom side, the head coupled to the head attach region of the flex circuit head interconnect such that the head gimbals about the dimple; and
    wherein the flex circuit head interconnect further includes a displacement limiter coupled to the base dielectric layer and disposed proximate the head attach region, the displacement limiter containing the tongue when the head is moved a predetermined distance away from the dimple.

10. The apparatus of claim 9 wherein the head attach region of flex circuit interconnect further includes a pair of elongate arms.

11. The apparatus of claim 10 wherein the displacement limiter comprises a strap coupled to and extending between the pair of elongate arms.

12. The apparatus of claim 11 wherein the displacement limiter extends generally transversely between the pair of elongate arms.

13. The apparatus of claim 10 wherein the pair of elongated arms are parallel and extend from the load beam to the head.

14. The apparatus of claim 8 wherein the load beam tongue further includes an extended dimple offset extending longitudinally from the tongue under the head attach region of the flex circuit interconnect to further limit downward head displacement.

15. The apparatus of claim 9 wherein the load beam tongue further includes a pair of ears extending transversely under the elongate arms of the flex circuit interconnect, such that downward movement of the head a predetermined distance causes collision between the elongate arms of the flex circuit interconnect and the transverse ears of the tongue.

16. The apparatus of claim 9 and further comprising a gimbal coupled to the load beam and the head, the gimbal including a pair of generally parallel elongate arms extending from the load beam to the head, the gimbal supporting the head attach region of the flex circuit head interconnect.

17. The apparatus of claim 16 wherein the gimbal is constructed from stainless steel and the base dielectric layer is constructed from a polyimide.

18. The apparatus of claim 9 wherein the displacement limiter is formed integral with the base dielectric layer.

19. The apparatus of claim 9 wherein the displacement limiter is constructed from an identical material as the dielectric layer.

* * * * *